United States Patent
Knaak et al.

(10) Patent No.: US 8,869,859 B2
(45) Date of Patent: Oct. 28, 2014

(54) DISPENSING AND SEALING SYSTEM

(71) Applicant: Sealed Air Corporation (US), Elmwood Park, NJ (US)

(72) Inventors: Michael Knaak, New Fairfield, CT (US); Scott Rote, New Lenox, IL (US); Mark Kurth, Beverly Shores, IN (US); Dan Johnson, Chicago, IL (US); Kyle Koning, Chicago, IL (US); Dan Somen, Chicago, IL (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 0 days.

(21) Appl. No.: 13/711,997

(22) Filed: Dec. 12, 2012

(65) Prior Publication Data

US 2014/0158305 A1    Jun. 12, 2014

(51) Int. Cl.
| | |
|---|---|
| *B29C 65/74* | (2006.01) |
| *B32B 37/00* | (2006.01) |
| *B32B 38/04* | (2006.01) |
| *B32B 39/00* | (2006.01) |
| *B30B 3/04* | (2006.01) |
| *B30B 15/34* | (2006.01) |
| *B65B 9/20* | (2012.01) |
| *B29C 44/18* | (2006.01) |

(52) U.S. Cl.
CPC .................................. *B29C 44/182* (2013.01)
USPC ............. 156/383; 156/515; 156/581; 53/451; 53/551

(58) Field of Classification Search
USPC .......... 156/73.1, 250, 251, 308.2, 308.4, 383, 156/510, 515, 581; 53/375.2, 450, 451, 53/550, 551
See application file for complete search history.

(56) References Cited

U.S. PATENT DOCUMENTS

| | | | |
|---|---|---|---|
| 3,448,546 A | 6/1969 | Windecker | |
| 3,932,258 A | 1/1976 | Brinkman et al. | |
| 5,255,847 A | 10/1993 | Sperry et al. | |
| 5,322,234 A | 6/1994 | Robert et al. | |
| 5,376,219 A | 12/1994 | Sperry et al. | |
| 5,660,904 A | 8/1997 | Andersen et al. | |
| 5,794,406 A | 8/1998 | Reichental et al. | |
| 5,942,076 A | 8/1999 | Salerno et al. | |
| 5,950,875 A | 9/1999 | Lee et al. | |
| 6,003,288 A | 12/1999 | Sperry et al. | |
| 6,034,197 A | 3/2000 | Mahon et al. | |
| 6,237,308 B1 * | 5/2001 | Quintin et al. | 53/451 |
| 6,272,816 B1 | 8/2001 | Viaud et al. | |

(Continued)

FOREIGN PATENT DOCUMENTS

JP    2012051580 A    *    3/2012

OTHER PUBLICATIONS

English Abstract of JP 2012-051580 (Dec. 9, 2013).*
Machine English Translation of JP 2012-051580 (Dec. 9, 2013).*

(Continued)

*Primary Examiner* — Sing P Chan
(74) *Attorney, Agent, or Firm* — Thomas C. Lagaly

(57) ABSTRACT

A dispensing and sealing system generally includes a film-feed assembly with a support mechanism for a supply of film and a film-drive mechanism to advance the film along a path, a dispenser with an outlet port for dispensing fluid into the film, and a transverse seal mechanism for forming a seal in the film transversely of the path. A calendering device and a movable structure for the support mechanism are also described.

21 Claims, 8 Drawing Sheets

(56) References Cited

U.S. PATENT DOCUMENTS

| | | |
|---|---|---|
| 6,289,649 B1 | 9/2001 | Cherfane |
| 6,386,850 B1 | 5/2002 | Salerno et al. |
| 6,550,229 B2 | 4/2003 | Sperry et al. |
| 6,617,367 B1 | 9/2003 | Gervais et al. |
| 6,675,557 B2 | 1/2004 | Sperry et al. |
| 6,761,016 B1 | 7/2004 | Soleri |
| 6,811,059 B2 | 11/2004 | Piucci, Jr. et al. |
| 6,929,193 B2 | 8/2005 | Ruddy |
| 6,966,166 B2 | 11/2005 | Kissling |
| 6,996,956 B2 | 2/2006 | Sperry et al. |
| 7,225,599 B2 | 6/2007 | Sperry et al. |
| 7,325,386 B2 | 2/2008 | Kissling |
| 7,341,632 B2 | 3/2008 | Noble |
| 7,367,171 B2 | 5/2008 | Bertram et al. |
| 7,607,911 B2 | 10/2009 | Sperry et al. |
| 7,641,459 B2 | 1/2010 | Sperry et al. |
| 8,146,332 B2 | 4/2012 | Slovencik |
| 2012/0080133 A1 | 4/2012 | Piucci, Jr. et al. |

OTHER PUBLICATIONS

U.S. Appl. No. 13/398,349.

* cited by examiner

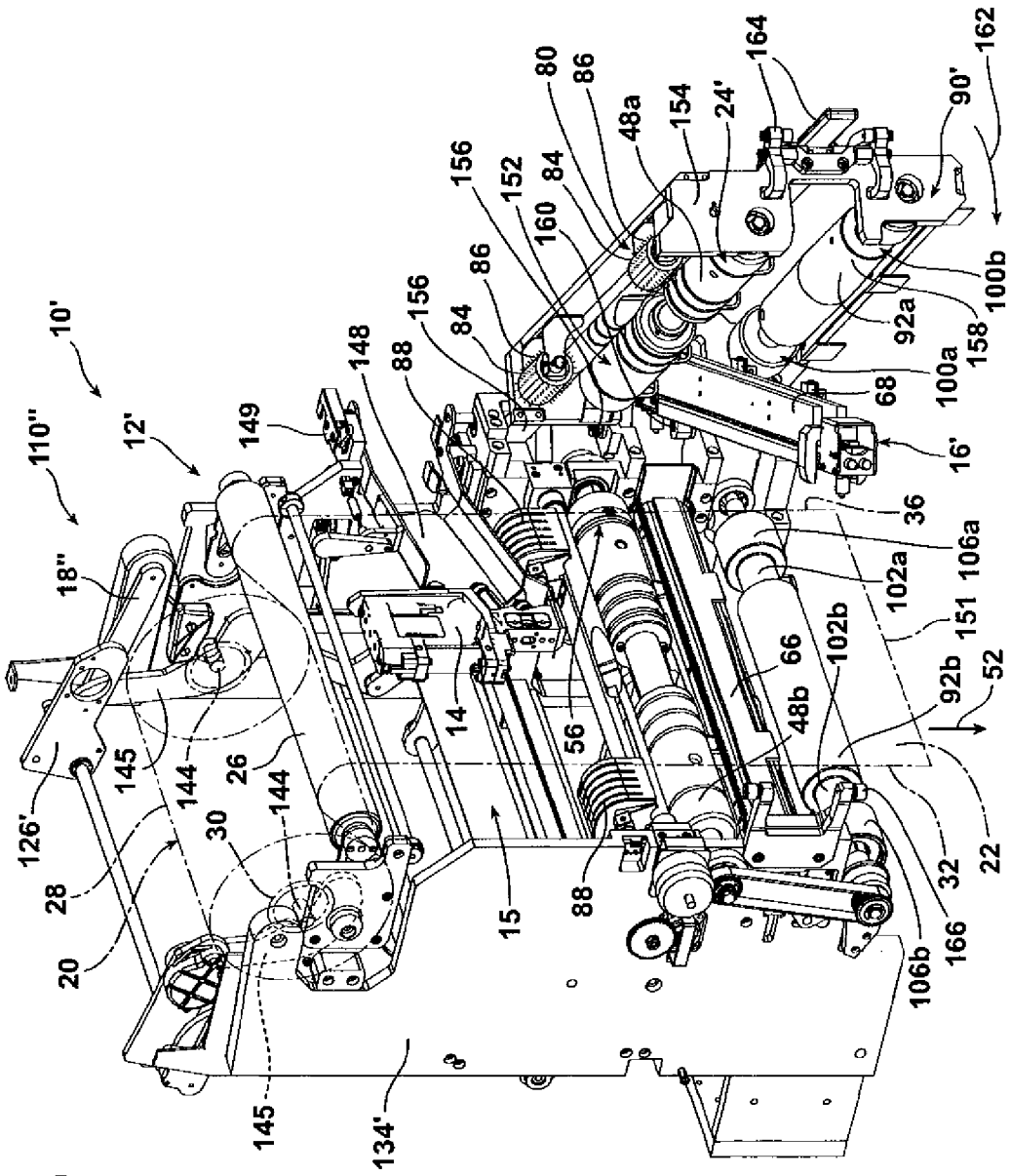

DISPENSING AND SEALING SYSTEM

BACKGROUND OF THE INVENTION

The present invention relates generally to an improved dispensing and sealing system and, more particularly, to an improved dispensing and sealing system that is adapted to produce foam-in-place packaging cushions.

Foam-in-place packaging is a highly useful technique for on-demand protection of packaged products. In its most basic form, foam-in-place packaging comprises injecting foamable compositions from a dispenser into a container that holds a product to be cushioned. Typically, the product is wrapped in plastic to keep it from direct contact with the rising (expanding) foam. As the foam rises, it expands into the remaining space between the product and its container (e.g. a box formed of corrugated paperboard), thus forming a custom cushion for the product.

A common foaming composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged product.

In other types of foam-in-place packaging, the foam precursors are injected into a plastic bag, which is then dropped into a container holding the product to be cushioned. The rising foam again tends to expand into the available space, but does so inside the bag. Because the bags are formed of flexible plastic, they form individual custom foam cushions for the packaged products. In several techniques, a specific apparatus is used to make the bag from plastic film while concurrently injecting it with foam. Exemplary systems for making such 'foam-in-bag' packaging cushions are assigned to the assignee hereof, and are illustrated, for example, in U.S. Pat. Nos. 5,027,583, 5,376,219, 6,003,288, 6,675,557, and 7,607,911, the disclosures of each of which are hereby incorporated entirely herein by reference thereto.

While the forgoing systems have been highly successful, the inventors hereof have devised improvements to such systems.

One aspect for improvement pertains to the expansion of the foam within the bags. Generally, the foam precursors are injected into the bag at a fixed location relative to the width of the bag, such that the resultant foam is left to expand outwards from its initial injection point without further manipulation. In many applications, it is desirable for the foam to be more evenly dispersed within the bag. Ideally, such dispersion would be carried in such a way that a more uniform cushion-thickness results, and so that there is a reduced tendency for the expanding foam to escape the confines of the bag, which generally requires the foam-in-bag system to be shut down for cleaning and removal of the foam.

Another aspect for improvement pertains to the supply of plastic film from which the bags are formed. Generally, such film is supplied in the form of a roll, which tends to be rather heavy and cumbersome, generally weighing in excess of 20 pounds, and often more than 30 pounds. As a result, it would be desirable for an improved film-loading mechanism, which facilitates the film-loading procedure for the operator, i.e., by making it easier to load a fresh film roll onto the machine, but without lengthening or complicating the film-path through the machine.

Accordingly, there remains a need in the art for improvements in dispensing and sealing systems for making foam-in-bag cushions, which overcome the foregoing difficulties.

SUMMARY OF THE INVENTION

Those needs are met by the present invention, which, in one aspect, provides a dispensing and sealing system, comprising:

a. a film-feed assembly comprising a support mechanism for a supply of film and a film-drive mechanism to advance the film along a path;

b. a dispenser with an outlet port for dispensing fluid into the film;

c. a transverse seal mechanism for forming a seal in the film transversely of the path; and d. a calendering device comprising at least two calender rollers, between which the film is advanced along the path after receiving fluid therein, the calender rollers having relatively non-parallel outer surfaces such that the fluid in the film is dispersed in a predetermined manner upon contact with the non-parallel outer surfaces.

A further aspect of the invention is directed towards a dispensing and sealing system, comprising:

a. a film-feed assembly comprising a supply of film and a film-drive mechanism to advance the film along a path;

b. a dispenser with an outlet port for dispensing fluid into the film;

c. a transverse seal mechanism for forming a seal in the film transversely of the path; and d. a calendering device, comprising a set of calender rollers through which the film is directed after receiving fluid therein, wherein the calendering device is positioned downstream of the transverse seal mechanism.

Another aspect of the invention pertains to a dispensing and sealing system, comprising:

a. a film-feed assembly comprising a support mechanism for a supply of film and a film-drive mechanism to advance the film along a path;

b. a dispenser with an outlet port for dispensing fluid into the film; and c. a transverse seal mechanism for forming a seal in the film transversely of the path, wherein, the support mechanism is movable between an operating position and a loading position such that, when the support mechanism is in the loading position, the mechanism supports the film supply:

(1) at a relatively lower elevation than when the support mechanism is in the operating position, and (2) relatively closer to an operator film-loading site than when the support mechanism is in the operating position.

These and other aspects and features of the invention may be better understood with reference to the following description and accompanying drawings.

BRIEF DESCRIPTION OF THE DRAWING

FIG. 9 is similar to FIG. 1, except showing the system in a film-threading position.

DETAILED DESCRIPTION OF THE INVENTION

Figure 1:
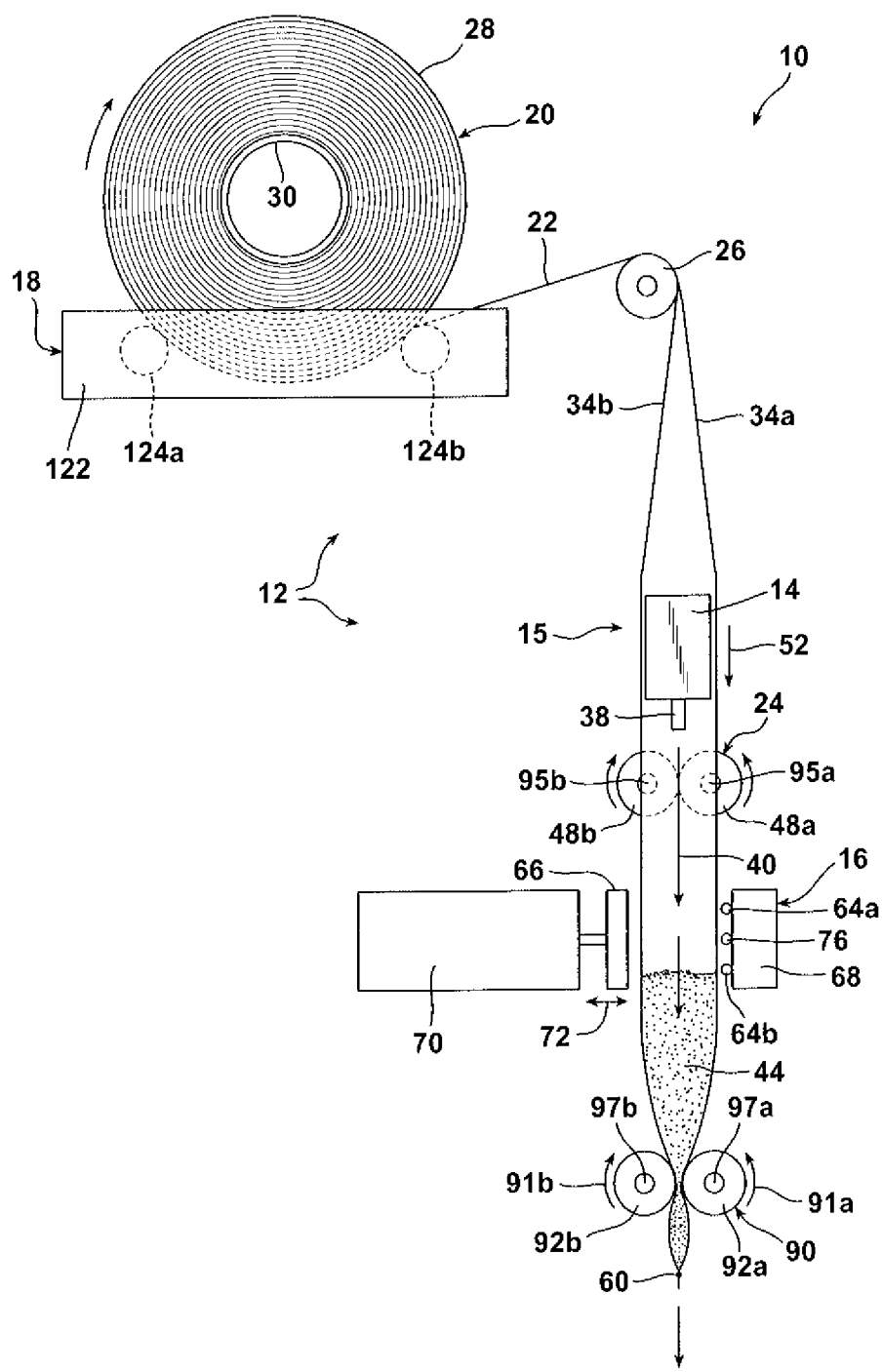
FIG. 1 is a schematic, side-elevational view of a dispensing and sealing system in accordance with the present invention, with a cross-sectional view inside of film web 22.
Figure 2:
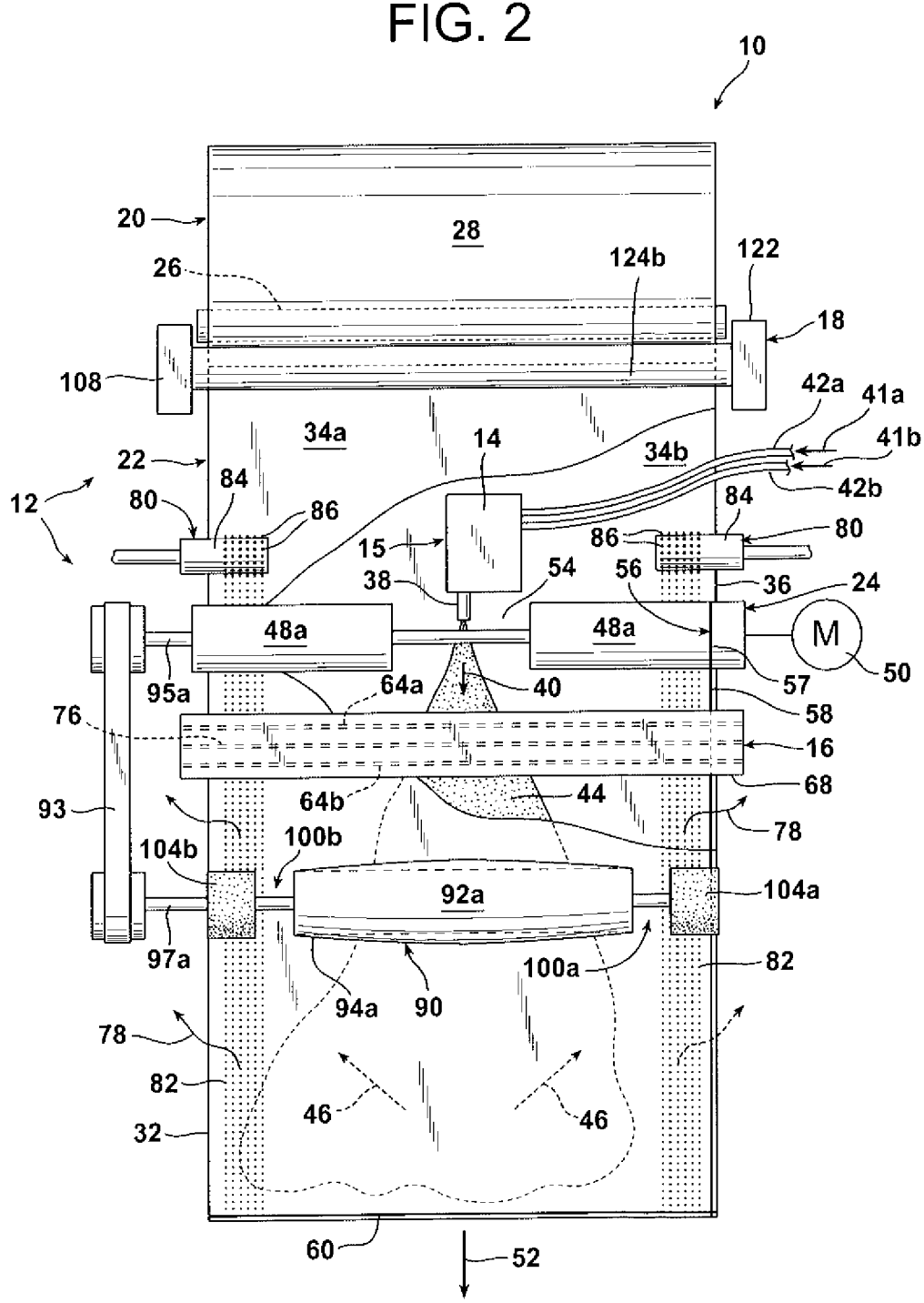
FIG. 2 is a front elevational view of the system shown in FIG. 1, with a partial break-out film ply 34a to show certain components of the system that are positioned inside the film web.
Figure 3:
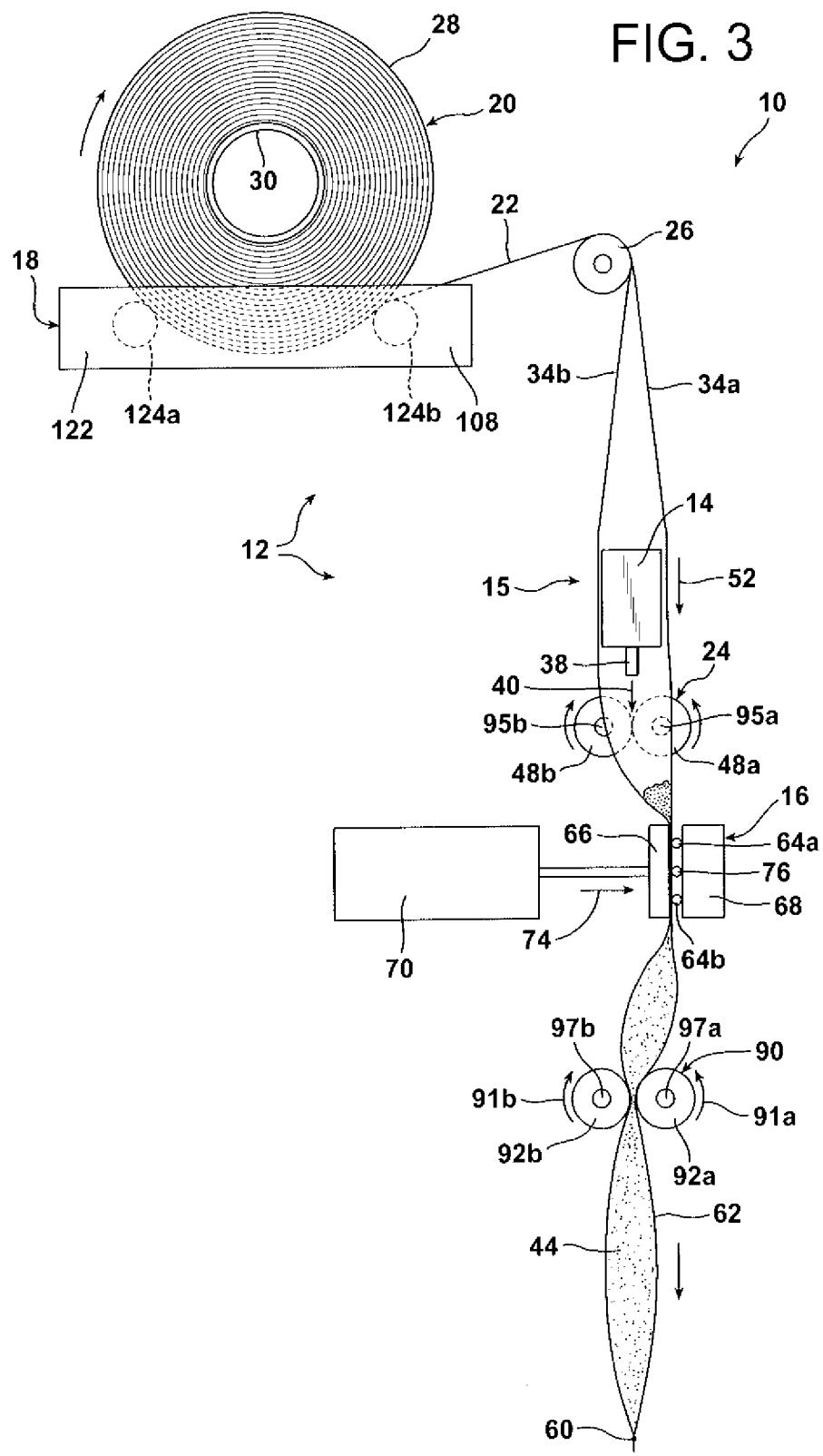
FIG. 3 is similar to FIG. 1, except showing a transverse seal being formed in the film web.

With reference to FIGS. 1-3, a dispensing and sealing system 10 in accordance with the present invention will be described. System 10 generally includes a film-feed assembly 12, a dispenser 14, and a transverse seal mechanism 16. Film-feed assembly 12 comprises a support mechanism 18 for a supply 20 of film 22, as well as a film-drive mechanism 24 to advance the film 22 along a path through system 10. As shown in FIGS. 1-3, such path for film 22, generally indicated by arrow 52, may lead from film supply 20, over guide roller 26, around dispenser 14, and through film-drive mechanism 24 and transverse seal mechanism 16. Film supply 20 may be in the form of a roll 28 wound on a core 30 as shown.

Film 22 may be a center-folded film or, alternatively, a pair of juxtaposed, discrete films, e.g., from a pair of rolls. As illustrated, film 22 is in the form of a center-folded web with a closed longitudinal edge 32, as formed by, e.g., a medial fold along the longitudinal length of the film, a pair of juxtaposed film plies 34a, b, and an open longitudinal edge 36 formed by the adjacent, unsealed edges of the juxtaposed film plies 34a, b, which are generally parallel to the closed longitudinal edge 32. Film 22 may be formed from any conventional polymeric materials from which flexible films are made, including polyolefins, polyesters (e.g., PET and PETG), polystyrenes, (e.g., modified styrenic polymers such as SEBS, SBS, etc.), polyamides (homopolymers and copolymers, e.g., PA6, PA12, PA6/12, etc.), polycarbonates, etc. Within the family of polyolefins, various polyethylene homopolymers and copolymers may be used, as well as polypropylene homopolymers and copolymers (e.g., propylene/ethylene copolymer). Polyethylene homopolymers may include low density polyethylene (LDPE) and high density polyethylene (HDPE). Suitable polyethylene copolymers may include a wide variety of polymers, such as, e.g., ionomers, ethylene/vinyl acetate (EVA), ethylene/vinyl alcohol (EVOH), and ethylene/alpha-olefins, including heterogeneous (Zeigler-Natta catalyzed) and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, including linear low density polyethylene (LLDPE), linear medium density polyethylene (MDPE), very low density polyethylene (VLDPE), and ultra-low density polyethylene (ULDPE).

Dispenser 14, which includes an outlet port 38, is structured and arranged to assume a dispensing position 15, as shown in FIGS. 1-3, in which fluid 40 flows from the outlet port 38 and into the web formed by film 22. In dispensing position 15 in the illustrated embodiment, dispenser 14 is positioned within the web formed by film 22, i.e., is enveloped by the juxtaposed film plies 34a, b, so that the dispenser can dispense fluid 40 directly into the film web 22. Dispenser 14 may be supported by a mounting bracket or the like (not shown in FIGS. 1-3, but see, e.g., swing arm 148 in FIGS. 8-9), which extends through the open longitudinal edge 36. When system 10 is configured to make foam-in-bag packaging cushions, dispenser 14 may be adapted to dispense polyols, isocyanates, and mixtures of polyols and isocyanates. The fluid 40 dispensed by dispenser 14 may thus be a foamable polyurethane composition produced by a reactive mixture of one or more polyols 41a, e.g., supplied to the dispenser by hose 42a, and one or more isocyanates 41b, e.g., supplied to the dispenser by hose 42b (see, FIG. 2, wherein part of film ply 34a is broken away for clarity). The hoses 42a, b may thus be in fluid communication with respective sources 41a, b of polyol and isocyanate, and may connect to dispenser 14 through the open longitudinal edge 36 as shown. A suitable pump (not shown) may be operatively associated with each of hoses 42a, b, e.g., an internal gear pump, such as an internal rotary gear pump commonly known as internal gerotor pump, e.g., as disclosed in U.S. Pat. No. 6,617,367, in order to provide fluid pressure to transport the polyol(s) 41a and isocyanate(s) 41b through respective hoses 42a, b and also through dispenser 14.

Within dispenser 14, the polyol(s) and isocyanate(s) are mixed, and the resultant fluid mixture 40 is expelled via the outlet port 38 and into film 22 as shown, wherein the fluid mixture 40 expands into a foam 44 within the film 22, as indicated by arrows 46 in FIG. 2. An exemplary such foamable polyurethane mixture is disclosed in U.S. Pat. No. 6,034, 197, the entire disclosure of which is hereby incorporated herein by reference thereto. Suitable dispensers that may be employed as dispenser 14 in system 10 are described in various patents owned by the assignee hereof, including U.S. Pat. Nos. 5,186,905, 5,255,847, 5,950,875, 6,811,059, 6,929,193 and 6,996,956, the disclosures of which are hereby incorporated herein by reference thereto, in their entirety.

Film-drive mechanism 24 may comprise a set, e.g., pair, of nip rollers 48a, b, between which film 22 passes to advance the film along its path 52 through system 10. At least one of nip rollers 48a, b may be driven. As illustrated, nip roller 48a is driven by drive means, e.g., motor, 50, which is labeled as "M" in FIG. 2. Alternatively, nip roller 48b could be driven by drive means 50. Drive means 50 may be any suitable device for providing rotational force, e.g., a pneumatic, hydraulic, or electric motor, and may be mechanically linked to nip roller 48a and/or 48b, directly (as illustrated) or indirectly (via a suitable linkage such as a chain, belt, gear train, etc.). Nip rollers 48a, b may be in compressive (nipping) contact, such that driving the rotation of roller 48a via drive means 50 also, and indirectly, drives the rotation of nip roller 48b (vice versa if nip roller 48b is driven by drive means 50). In addition, compressive contact between nip rollers 48a, b results in a compressive force being exerted in film 22 when directed between the nip rollers 48a, b, thereby forcing the film to move in direction 52 along its path through system 10. At least one, e.g., both, of the nip rollers 48a, b may have a gap 54 to allow fluid 40 from dispenser 14 to pass through nip rollers as shown in FIG. 2. Further details concerning the film-drive mechanism may be found in the above-incorporated U.S. Pat. No. 6,003,288, and also in U.S. Pat. No. 5,376,219, the entire disclosure of which is hereby incorporated herein by reference thereto.

As also described in the '288 and '219 patents, system 10 may further include a longitudinal seal mechanism, e.g., longitudinal edge-seal device 56, to close the open longitudinal edge 36, e.g., by forming a continuous longitudinal seal 58, beginning at a point just downstream of dispenser 14 and running substantially parallel to longitudinal edge 36 as shown in FIG. 2, to thereby longitudinally seal the open edge 36 of the film web 22 substantially continuously and contemporaneously with both the advancement of the film web 22 along its path 52 through system 10, and the dispensation of fluid 40 into the film web. As shown, the edge-seal device 56 may be carried on the outer surface of nip roller 48a, or may instead be carried on the outer surface of nip roller 48b. The edge-seal device 56 may include a sealing element 57 to effect melt-bonding (welding) of the juxtaposed film plies 34a,b at open edge 36. Sealing element 57 may be, e.g., an electrically-resistive heating element such as a wire, band, etc., which may be in direct or indirect contact with the surface of film web 22, e.g., as described in the '288 and '219 patents, and also in U.S. Pat. Nos. 6,550,229 and 7,225,599, the entire disclosures of which are hereby incorporated herein by reference thereto.

Alternatively, as shown in FIG. 9 for example, the edge-seal device 56 may include its own, independent support structure, and may be positioned adjacent one of the nip rollers 48a, b near the open edge 36 of film web 22, with a stationary heat-seal contact surface that is positioned such that it is coextensive, e.g., 'co-cylindrical,' with the surface of the adjacent nip roller, so that the film web is brought into compressive contact with such heat-seal surface via rotation thereagainst by the opposing nip roller. Further details concerning such an edge-seal device may be found in U.S. Pub. No. US-2012-0080133-A1, the entire disclosure of which is hereby incorporated herein by reference thereto.

Transverse seal mechanism 16 forms a seal 60 in the film web 22 transversely of the path, e.g., transverse to direction 52. In combination with longitudinal seal 58, such transverse seals 60 enclose the fluid 40/foam 44 within the film web 22 in the form of individual containers 62, e.g., bag-like containers, as shown in FIG. 3. In the illustrated embodiment, transverse seal mechanism 16 is a 'double seal' type transverse sealing mechanism, in that it includes a pair of transverse sealing elements 64a, b, e.g., bands, wires, or other types of electrically-resistive elements. When in a sealing position as shown in FIG. 3, a portion of the film web 22 is urged against the sealing elements 64a, b by seal bar 66. The transverse sealing elements 64a, b are disposed on a support member 68, which positions the sealing elements 64a,b on one side of the film web 22, with the seal bar 66 on the opposing side of the film web. An actuator 70, e.g., a pneumatic, electric, or hydraulic piston-cylinder-pushrod device as shown, is provided for advancing and retracting the seal bar 66 toward and away from the film web 22, as indicated by the double-headed arrow 72 (FIG. 1). Further details regarding transverse sealing mechanism 16 are disclosed in U.S. Pat. No. 5,942,076, the disclosure of which is hereby incorporated herein by reference thereto.

In FIG. 3, actuator 70 has moved seal bar 66 in sealing direction 74, such that the film web 22 is compressed between the seal bar 66 and the sealing elements 64a, b. When energized, e.g., by causing electricity to flow through the sealing elements 64a, b when they are electrically-resistive sealing elements, this compressive action causes sealing element 64b to produce a top transverse seal for container 62, which provides the final closure for and thereby completes the formation of such container, and also causes sealing element 64a to produce a bottom transverse seal for the next container to be formed, the beginnings of both of which are shown in FIG. 3. Such transverse seals being formed by transverse seal mechanism 16 are identical to the transverse seal 60 depicted in FIGS. 1-3, which is a bottom transverse seal for container 62.

In some embodiments, the transverse seal mechanism 16 may be structured and arranged to both sever and seal the film web 22. Transverse seal mechanism 16 may thus further include a transverse severing element 76, to transversely sever the film web 22 in between the transverse seals 60 formed by transverse sealing elements 64a, b, in order to allow container 62, and all such containers, to be separated from film web 22. The transverse severing element may be an electrically-resistive element, which severs web 22 by heating to a temperature sufficient to melt through the web, e.g., as described in the above-incorporated U.S. Pat. Nos. 5,376,219 and 6,003,288. The temperature to which the severing element 76 will be heated in order to sever the film web 22 will generally be higher than the temperature to which the sealing elements 64a, b are heated, which need only be sufficient to cause film welding without melting through the web. Alternatively, severing element 76 could be a cutting blade or the like to effect mechanical severance of film web 22. As a further alternative, a single sealing/severing element could be employed, which both seals and severs the film web, e.g., as described in the '219 and '288 patents.

For applications in which fluid 40 is a mixture of polyol(s) and isocyanate(s) to form polyurethane foam 44, a gas 78 (FIG. 2), comprising $CO_2$ and water vapor, will be produced as a result of the chemical reaction between the foregoing reactants. In this case, as shown in FIGS. 2 and 9, systems 10 and 10' desirably include one or more vent mechanisms 80 for producing vent-openings 82 in the film web 22, e.g., adjacent the closed longitudinal edge 32 and/or open longitudinal edge 36 as shown. Such vent-openings 82 in the containers 62 being formed allow the gas 78 produced from the foaming process to be released from the containers. As shown, a pair of vent mechanisms 80 are included, each of which may include a needle roller 84 with outwardly projecting needles 86, which are urged against and puncture the film web 22 as it is conveyed past the vent mechanisms 80. A backup device 88 (FIG. 9) may be included for each needle roller 84, so that the film web 22 is compressed between the needle roller and backup device to facilitate the vent-making operation. As shown in FIG. 9, the backup device 88 may have a plurality of grooves corresponding to the pattern of needles 86. Thus, as the film web 22 passes between each needle roller 84 and corresponding backup device 88, the vent openings 82, in the form of needle holes, are formed in the film web near the closed and open longitudinal edges 32 and 36 as shown in FIG. 2. Further details regarding the configuration and operation of the vent mechanisms 80 may be found in U.S. Pat. No. 7,160,096, the entire disclosure of which is hereby incorporated herein by reference thereto.

With continuing reference to FIGS. 1-3, in accordance with one embodiment of the invention, system 10 includes a calendering device 90. Calendering device 90 comprises at least two calender rollers 92a, b, between which film web 22 is advanced along its path 52 through system 10 after receiving fluid 40/foam 44 therein. Calendering device 90 advantageously provides for a more even dispersion of the foam 44 within the film web 22/final container 62, by mechanically spreading the foam laterally from its initial dispensation point inside the film web 22. Such mechanical dispersion by calendering device 90 directs the natural expansion of the foam in a predetermined and desired manner, e.g., to produce a foam cushion having a more uniform thickness.

Calender rollers 92a, b may be rotatable, e.g., counter-rotatable as indicated by the opposing rotational arrows 91a, b in FIGS. 1 and 3. Such rotation may be passive, as caused by physical contact with film web 22 as the film is conveyed along its path through system 10, or active, e.g., driven by a drive means. As shown in FIG. 2, for example, calender rollers 92a, b may be actively driven, e.g., indirectly by drive means 50 via mechanical linkage 93 between calender roller 92a and film-drive mechanism 24, wherein calender rollers 92a, b are in a nipping arrangement such that the driven rotation of roller 92a causes the rotation of roller 92b. Mechanical linkage 93 may be, e.g., a belt, chain, gear-train, etc. Both the nip rollers 48a, b and the calender rollers 92a, b may include respective spindles 95a, b and 97a, b, through which rotational force is imparted by drive means 50.

Figure 4:
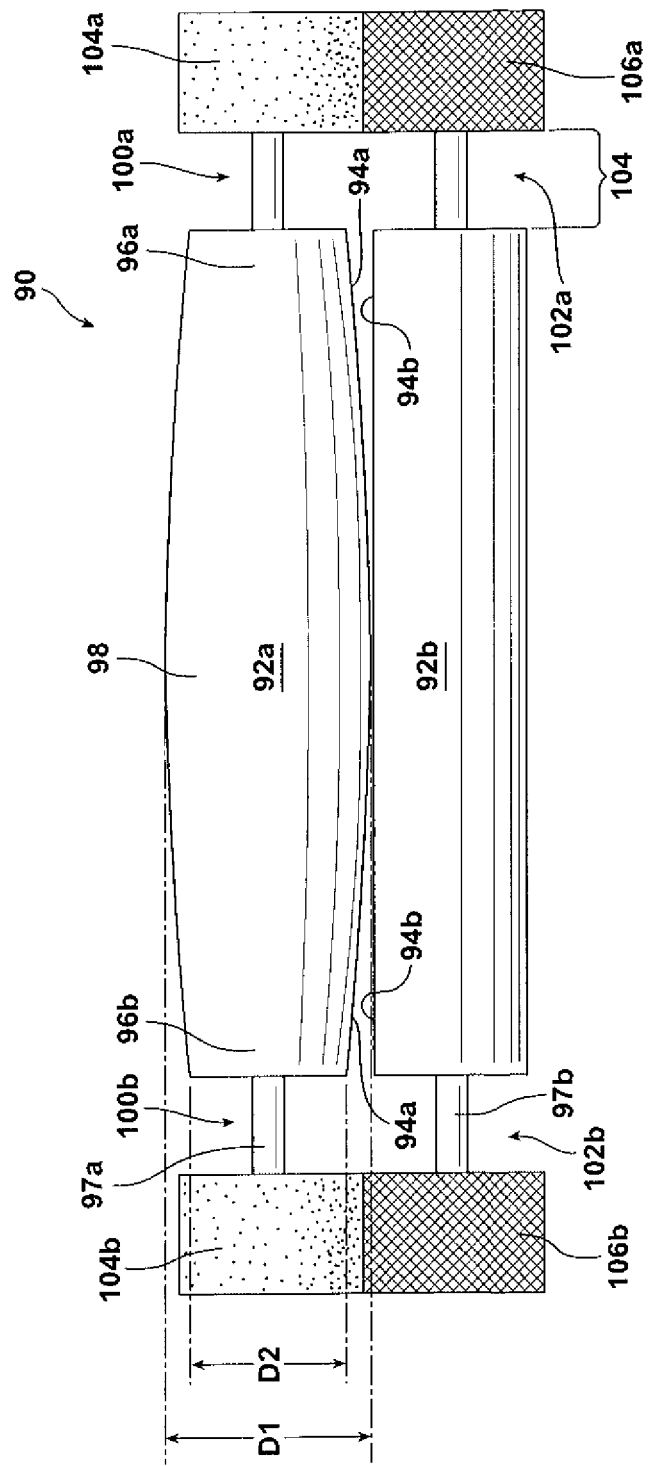
FIG. 4 is a plan view of the calendering device 90 shown in FIG. 1.

Referring now to FIG. 4, in some embodiments of the invention, calender rollers 92a, b may have relatively non-parallel outer surfaces 94a and 94b, respectively, such that fluid 40 in the film 22 is dispersed in a predetermined manner upon contact with such non-parallel outer surfaces 94a, b. As shown in FIGS. 1 and 3, such contact between outer surfaces 94a, b of calender rollers 92a, b and film web 22 is compressive contact, which exerts a force on the fluid 40/expanding foam 44 inside the film web. Based on the particular shape selected for the non-parallel outer surfaces 94a, b, such force can be directed in a predetermined way to achieve a predetermined dispersion of the foam.

For example, at least one of the calender rollers 92a, b, e.g., roller 92a as illustrated, may include a pair of end sections 96a, b and a middle section 98 therebetween. Further, roller 92a may be tapered, with a diameter that decreases from middle section 98 towards the end sections 96a, b, so that a gap is formed between the rollers 92a, b, which widens from the middle section 98 towards both end sections 96a, b. In FIG. 4, the diameter of middle section 98 is designated as "D1" while that of end sections 96a, b is designated "D2." As shown, the diameter D1 of middle section 98 is greater than the diameter D2 of the end sections 96a, b. The diameter D2 of each of the end sections 96a, b may range, e.g., from greater than 50% to less than 100% of the diameter D1 of the middle section 98, such as D2 ranging from about 75% to about 99% of D1.

With the arrangement for calender device 90 as shown in FIG. 4, a greater compressive force is exerted upon the expanding foam 44 by middle section 98 than by end sections 96a, b, which directs the foam 44 away from middle section 98 and towards end sections 96a, b. The fluid 40/foam 44 in film web 22 tends to concentrate in the region of the film web directly beneath outlet port 38 of dispenser 14. By aligning the middle section 98 of calender roller 92a with the outlet port 38 as shown in FIG. 2, this foam concentration can be more effectively dissipated, and the foam can therefore be more effectively distributed, than would be the case if calender rollers 92a, b had parallel surfaces.

In other applications, alternative non-parallel surface arrangements may be employed. For example, it may be desirable to direct the foam towards one of the longitudinal edges 32, 36, e.g., towards closed longitudinal edge 32. In this case, instead of calender roller 92a having a symmetrical tapered shape as shown, an asymmetrically tapered shape could be employed, e.g., with the largest diameter section thereof being positioned nearer to the open longitudinal edge 36 than to the closed longitudinal edge 32.

In other embodiments, at least one of the calender rollers 92a, b may provide at least one excess-fluid escape channel. In the arrangement illustrated in FIG. 4, each of calender rollers 92a, b may include such excess-fluid escape channels, with calender roller 92a including a pair of escape channels 100a, b and calender roller 92b including a pair of escape channels 102a, b. As shown, at least one, e.g., all, of the excess-fluid escape channels 100a, b and 102a, b may be formed by gap regions 104 of reduced diameter on the calender rollers 92a, b relative to adjacent regions thereof, e.g., extending down to spindles 97a, b, which have a smaller diameter than the co-axial outer surfaces 94a, b. As also shown, at least one, e.g., both, of the excess-fluid escape channels 100a, b may be positioned adjacent to at least one, e.g., both, of the respective end sections 96a, b of calender roller 92a, with a similar arrangement of excess-fluid escape channels 102a, b being shown for calender roller 92b. The excess-fluid escape channels 100a, b and 102a, b advantageously provide surge capacity, i.e., excess volume, when needed, e.g., in the event that the particular mixture in fluid 40 leads to a foam volume that exceeds the volume permitted by calendering device 90. Thus, instead of such excess fluid (e.g., excess foam) backing up towards dispenser 14 and escaping the confines of film web 22, which is referred to as a 'foam-up,' the excess fluid/foam flows into the excess-fluid escape channels 100a, b and 102a, b, and thus remains confined within film web 22. Avoidance of foam-ups is highly desirable, as foam-ups generally require the entire, e.g., foam-in-bag, system to be shut down for cleaning and removal of the foam, which is particularly onerous when fluid 40 is polyol/isocyanate mixture that produces polyurethane foam 44, as polyurethane foam is highly adhesive, making it very difficult to clean and remove from machine surfaces.

Calender rollers 92a, b may further include nip rollers to assist in the advancement of film web 22 along its path through system 10. Thus, calender roller 92a may include a pair of nip rollers 104a, b adjacent each of respective excess-fluid escape channels 100a, b as shown in FIG. 4. Similarly, calender roller 92b may include a pair of nip rollers 106a, b adjacent each of respective excess-fluid escape channels 102a, b as also shown in FIG. 4. Nip rollers 104a, b may be formed from a resilient material, such as rubber, while nip rollers 106a, b may be formed from a harder material, such as metal, with a knurled outer surface.

In accordance with another embodiment of the invention, calendering device 90 may be positioned downstream of the transverse seal mechanism 16, e.g., as shown in FIGS. 1-3. This arrangement provides another means for avoiding foam-ups, by spacing the calendering device 90 from dispenser 14, with transverse seal mechanism 16 positioned therebetween. The spacing provides volumetric capacity for any excess foam expansion caused by the calendering operation. Further, the placement of the calendering device 90 downstream of the transverse seal mechanism 16 provides a greater likelihood that a transverse seal 60 can be formed at the top of the container 62 being produced, to thereby close the container and enclose the fluid 40/foam 44 therein before it expands upwards and out of the container, than if the calendering device 90 were positioned, e.g., upstream of the transverse seal mechanism 16.

Figure 5:
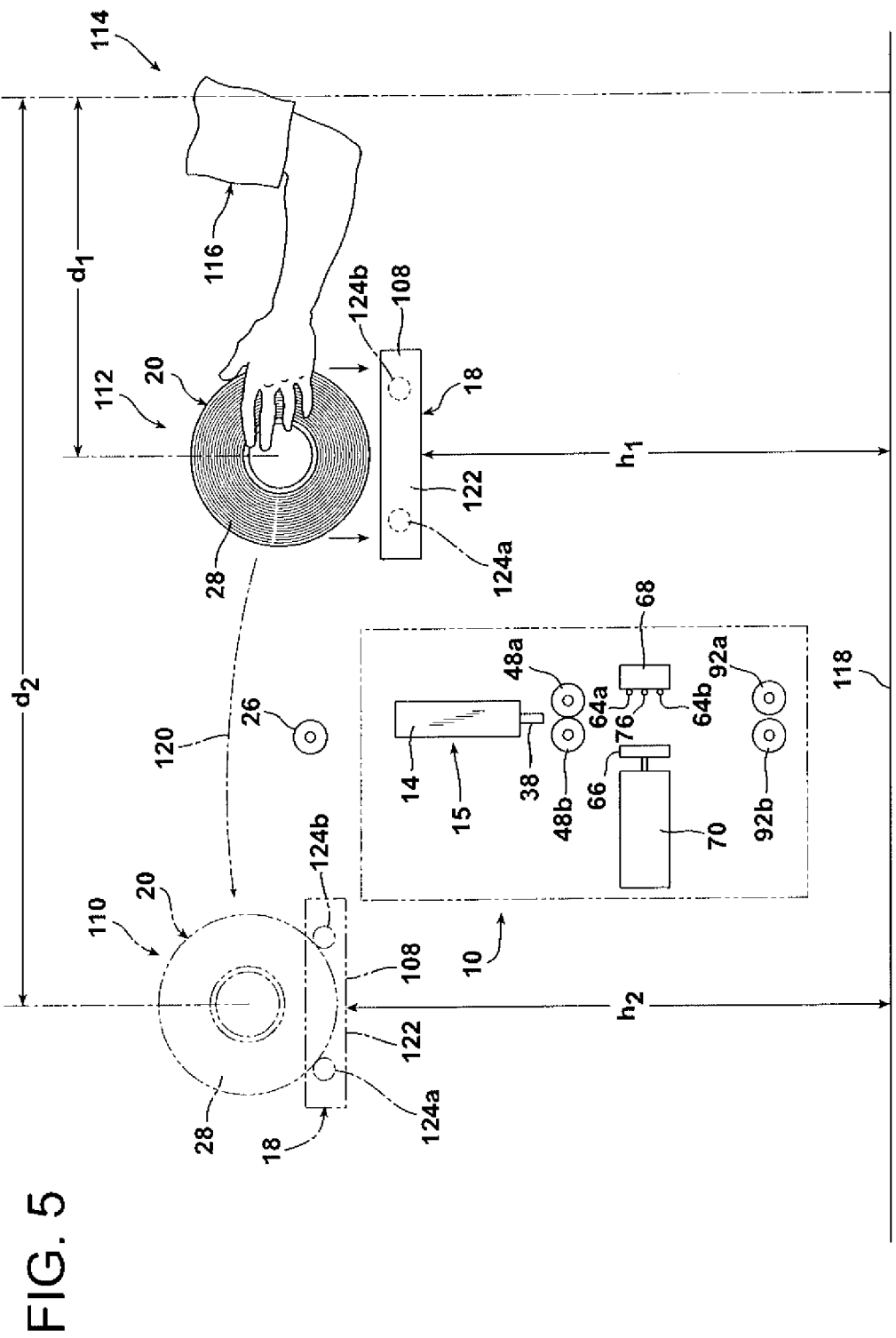
FIG. 5 is a schematic view of a process for loading a new film supply 20 into the system shown in FIG. 1.
Figure 6:
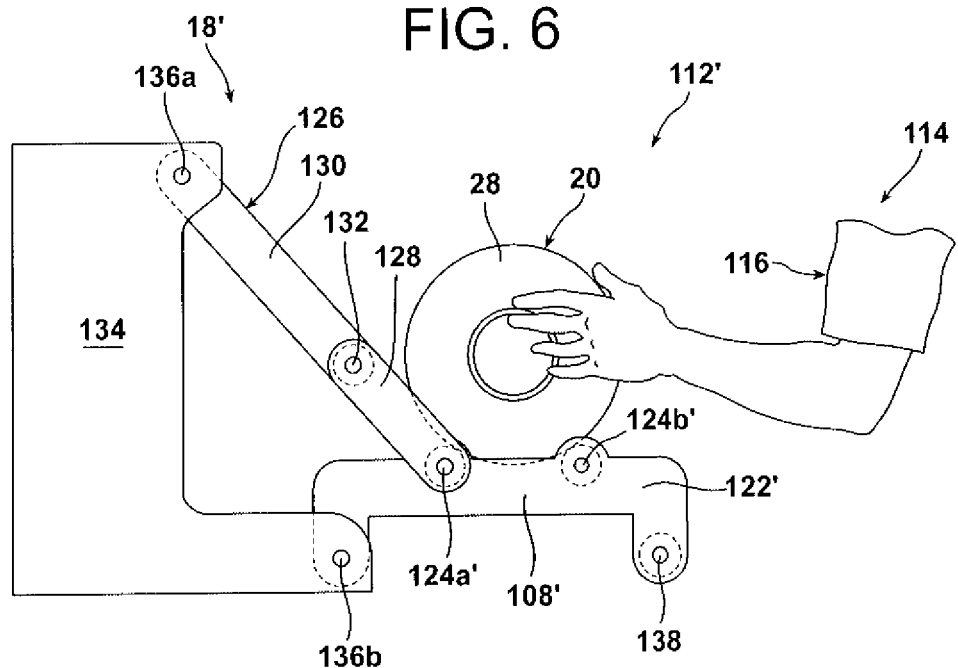
FIGS. 6-7 are similar to FIG. 5, except showing an alternative support mechanism for the film supply.
Figure 7:
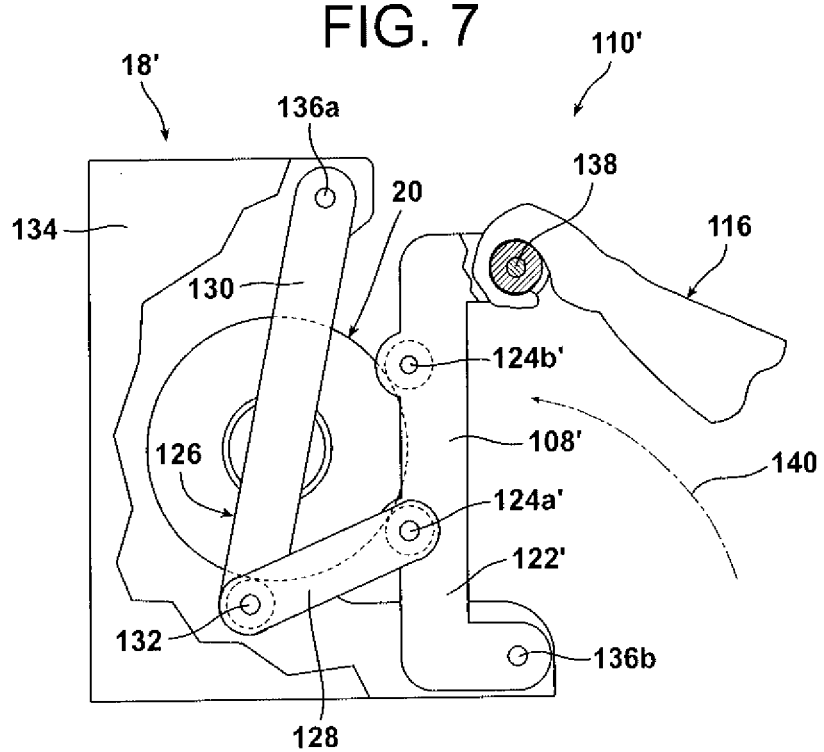

Referring now to FIGS. 5-7, another embodiment of the invention will be described. Support mechanism 18 may be movable between an operating position 110 and a loading position 112 (the operating position 110 is also shown in FIGS. 1-3). When support mechanism 18 is in the loading position 112, it (mechanism 18) supports the film supply 20 at a relatively lower elevation "$h_1$" than when the support mechanism 18 is in the operating position 110, at which it is at a relatively higher elevation "$h_2$". Further, when support mechanism 18 is in the loading position 112, it supports the film supply 20 at a position that is relatively closer to an operator film-loading site 114 than when the support mechanism 18 is in the operating position 110.

This embodiment facilitates the process of replacing the film supply 20, when it has been depleted, with a fresh film supply 20, e.g., a full film roll 28 as shown. As noted above, film is often supplied in the form of rolls 28, which are generally heavy and bulky. Thus, it is desirable to minimize the extent to which operators of foam-in-bag systems must lift and/or reach in order to load new film rolls into such systems.

By being movable to a lower elevation "$h_1$" in loading position 112 vs., e.g., its higher elevation "$h_2$" in operating position 110, the movable support mechanism 18 of the present embodiment facilitates the film-loading operation by requiring the new film supply 20 to be lifted to a relatively lower height $h_1$ by operator 116 when support mechanism 18 is in loading position 112 vs. the greater height $h_2$ when support mechanism 18 is in operating position 110 (FIG. 5). In the illustrated example, elevational heights $h_1$ and $h_2$ are with respect to the ground 118 on which system 10 rests (support stand or the like for system 10 not shown). Thus, the phrase "relatively lower elevation" as set forth herein is also to be understood with reference to the ground 118, e.g., as would be measured and compared in the vertical dimension, i.e., along a ray extending radially outwards from the center of the earth.

A movable support mechanism 18 in accordance with the present embodiment further facilitates the process of replacing the depleted film supply 20 with a fresh film supply 20 by moving horizontally closer to the operator film-loading site 114 when the mechanism 18 is in the loading position 112 vs. its location in the operating position 110. This necessitates less reaching on the part of operator 116 in order to place the new film supply 20 on the support mechanism 18 in its loading position 112 vs. its operating position 110 (FIG. 5). The "operator film-loading site" is the location, indicated at 114 in FIG. 5, in which operator 116 of system 10 is positioned, e.g., stands, when loading new film supply 20, e.g., roll 28, into system 10 as shown, i.e., facing the system 10. Thus, in loading position 112, the support mechanism 18 allows the film supply 20 to be loaded onto mechanism 18 at a distance "$d_1$" from the operator film-loading site 114. Advantageously, distance d1 is relatively closer to loading site 114 than the distance "$d_2$" between the position of the support mechanism 18 and the operator film-loading site 114 when the support mechanism 18 is in the operating position 110. In the illustrated embodiment, distances $d_1$ and $d_2$ are measured and compared in a generally horizontal direction, i.e., parallel to the surface of the earth. Distance $d_1$ (loading position 112) is less than distance $d_2$ (operating position 110), such that the loading of new film supply 20 on support mechanism 18 occurs between system 10 and operator 116, rather than requiring the operator to reach over and beyond system 10, as would be required to load film supply 20 onto support mechanism 18 when in the operating position 110.

Once new film supply 20 is installed, e.g., placed, on support mechanism 18, the support mechanism 18 can be moved, e.g., along path 120, from the loading position 112 to the operating position 110 as shown in FIG. 5. The operating position 110 then provides a more optimal location from which the film supply 20 can supply film 22 to system 10 for the filling, sealing and severing operations as described above, e.g., by providing a relatively short path of travel for the film to feed into system 10, i.e., in comparison to that which would be required if the film 22 were fed from the loading position 112. In addition, placement of film supply 20 in operating position 110 allows the operator 116 to have access to system 10, e.g., to receive completed containers 62 from the system, without being physically hindered by the film supply, as would be the case if the film supply remained in the loading position 112 during operation of the system.

As also shown in FIG. 5, support mechanism 18 may be structured and arranged such that, when in the loading position 112, it presents a loading rack 108, which may be in the form of a cradle with a loading frame 122 and two support rollers 124a, b. In such configuration, the loading rack 108 may, in addition to supporting film supply 20 in loading position 112, also support film supply 20 in operating position 110. When the support mechanism 18 is configured in this manner, the movement of mechanism 18 to operating position 110 allows film 22 to be withdrawn from film supply 20 by film-drive mechanism 24 and advanced along the path 52 through system 10 as shown in FIGS. 1-3, all the while the film supply 20 remains supported on loading rack 108. The support rollers 124a, b allow the film supply 20, in the form of roll 28, to rotate on such rollers as the film 22 is withdrawn from the roll. The loading rack 108 may, e.g., as a part of support mechanism 18, be movably supported by any suitable structure (not shown) to allow the loading rack 108 to be moved between the operating and loading positions 110, 112 of support mechanism 18, e.g., a track-and-roller system, pivot arms, etc., as actuated manually or via a powered system, e.g., a hydraulic, pneumatic, electrical, or electro-magnetic powered systems, such as a piston-and-cylinder system, a motorized chain and/or gear-train system, etc.

An alternative arrangement is shown in FIGS. 6-7, wherein alternative support mechanism 18' is in the form of a 4-bar linkage system 126. Alternative support mechanism 18' includes a loading rack 108', which is similar to loading rack 108 as described above, except that the loading rack 108' is integrated into the 4-bar linkage system 126. Like loading rack 108, alternative loading rack 108' includes support rollers 124a' and 124b', as well as loading frame 122', which allow operator 116 to place film supply 20 thereon when support mechanism 18' is in the loading position 112' as shown in FIG. 6.

The 4-bar linkage system 126 further includes connector bars 128, 130, which are pivotally linked by connecting roller 132. 4-bar linkage system 126 also includes upright frame 134, to which connector bar 130 and loading frame 122' are pivotally connected via pivotal fasteners 136a, b, and a handle member 138. Once the new film source 20 has been loaded onto the loading rack 108' as shown in FIG. 6, the support mechanism 18' can be moved in direction 140 from the loading position 112', and into the operating position 110' as shown in FIG. 7. Such movement may be effected by operator 116 grasping handle member 138, and pushing the loading frame 122' towards upright frame 134 as shown. In so doing, loading frame 122' pivots about fastener 136b, which causes connector bars 128, 130 to fold together about connecting roller 132. The film source 20 is thus moved in direction 140 from the lower-elevation/horizontally-outward (closer to film-loading site 114) loading position 112' in FIG. 6, to a higher-elevational position and inside of upright frame 134 as support mechanism 18' is moved into the operating position 110' (FIG. 7).

Although not all the way into the operating position 110' in the view shown in FIG. 7, it may be seen that, when the movement along direction 140 is complete, the film source 20 will be rotatably supported on connecting roller 132 and support roller 124a', with such rollers and connector bar 128 effectively forming an 'operating rack,' which performs in essentially the same manner as the loading rack 108 in FIG. 5 when the support mechanism 18 is in the operating position 110. As may be appreciated, the alternative support mechanism 18' thus shifts the placement of film supply 20 from being supported on loading rack 108', when the mechanism 18' is in the loading position 112' (FIG. 6), to being supported on an 'operating rack' as formed by connecting rollers 124a', 132 and connector bar 128 when mechanism 18' is in the operating position 110' (FIG. 7). Handle member 138 may be in the form of a roller, and may serve a dual role by also functioning as the guide roller 26 in system 10 as shown in FIGS. 1-5 when mechanism 18' is in operating position 110'.

Figure 8:
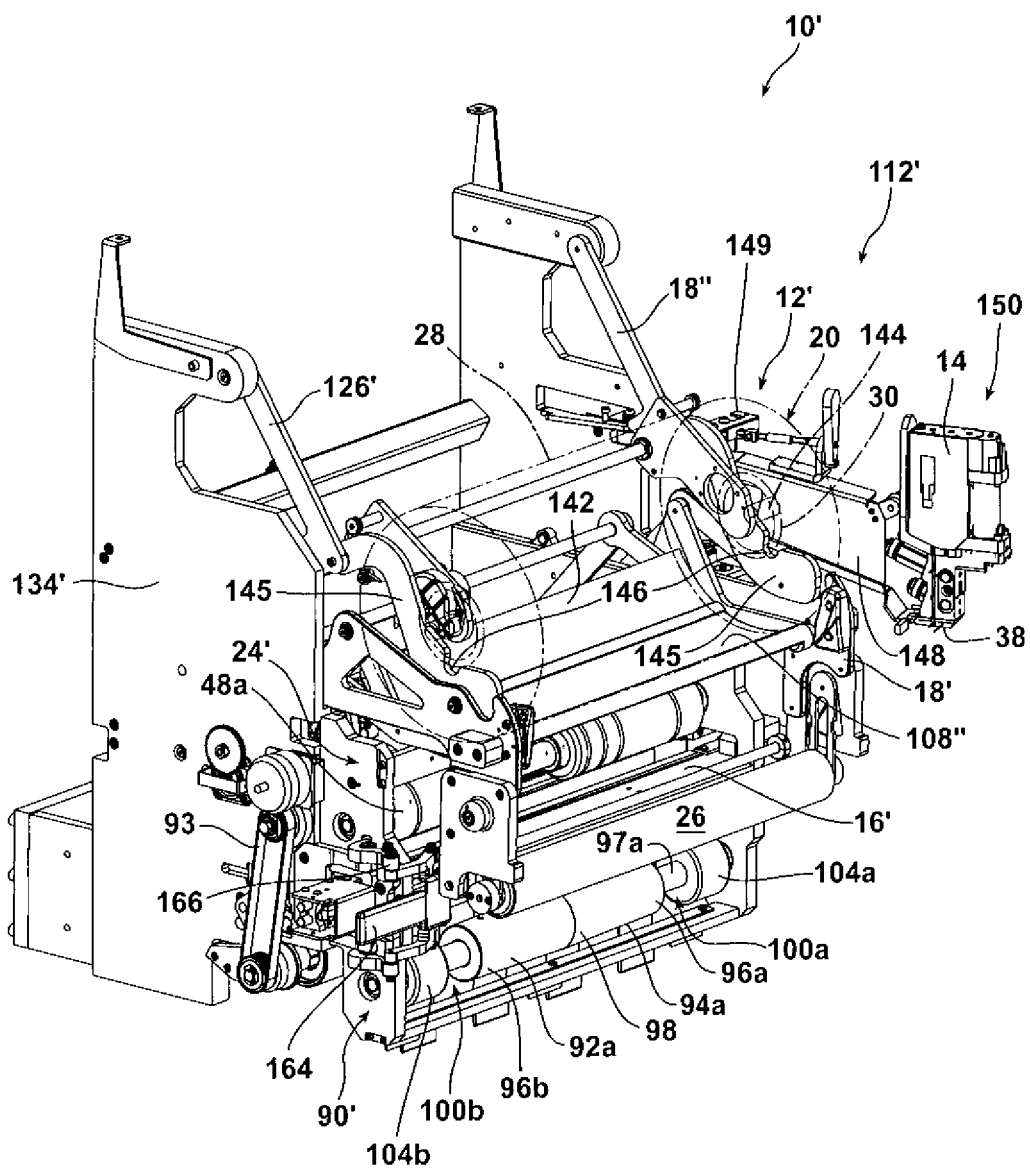
FIG. 8 is a perspective view of an alternative dispensing and sealing system in accordance with the present invention.

FIGS. 8 and 9 illustrate an alternative dispensing and sealing system 10', wherein like components are identified with the same numbers as used for the above description of system 10. In system 10', a further alternative support mechanism 18" is employed. In FIG. 8, mechanism 18" is shown in the loading position 112" while in FIG. 9, it is shown in the operating position 110". In this embodiment, loading rack 108" comprises a tray-like platform with a curved receiving surface 142, onto which film supply 20 (shown in phantom) may be loaded as shown in FIG. 8. Like support mechanism 18', support mechanism 18" comprises a 4-bar linkage system 126', of which loading rack 108" is a component. Also like support mechanism 18', mechanism 18" may be moved from the loading position 112" and into the operating position 110" by grasping guide roller 26, which, in such operation, provides a handle member for the operator. The roller/handle member 26 may thus be pushed and moved, e.g., along direction 140 as shown in FIG. 7, to thereby move the film supply 20 from the lower-elevation/horizontally-outward location in loading position 112" (FIG. 8), to the higher-elevational location inside of upright frame 134' in operating position 110" (FIG. 9).

In contrast to the cradle-type loading rack 108/108' shown in FIGS. 1-7, the loading rack 108" is a relatively simpler structure, i.e., a platform with, e.g., a curved receiving surface 142. In this embodiment, film roll 28 may include a pair of core-plug/spindle devices 144, with each being inserted into opposing ends of core 30 as shown in FIGS. 8-9. The linkage system 126', e.g., bars 145 thereof, may include a pair of opposing notches 146 which, as shown, are positioned to engage the core-plug/spindle devices 144 as the support mechanism 18" is moved from loading position 112" to the operating position 110". In this manner, when support mechanism 18" is in operating position 110", film roll 28 is rotatably supported by mechanism 18", but with loading rack 108" no longer in contact with the roll 28 and the core-plug spindles 144 being rotatably carried in notches 146 of bars 145 as shown in FIG. 9. Thus, while the film roll 28 is initially carried, e.g., non-rotatably, by loading rack 108", during the movement of mechanism 18" from the loading position 112" to the operating position 110", the weight of the roll 28 transfers to bars 145 via notches 146/spindles 144, so that the roll 28 is suspended and can thus rotate freely to pay out the film web 22 during the operation of system 10'. Further details concerning the core-plug/spindle devices 144 are described in U.S. Pat. No. 5,322,234, the entire disclosure of which is hereby incorporated herein by reference thereto.

With continuing reference to FIGS. 8-9, it may be seen that, as an additional feature of system 10', the film-feed assembly 12', dispenser 14, transverse seal mechanism 16, and calendering device 90 may each be attached to frame 134' in the form of an integrated and, e.g., compact, assembly. Further, dispenser 14 may be movably, e.g., pivotally, attached to frame 134', e.g., on swing arm 148, which is pivotally attached to frame 134' at pivotal connection 149. In this manner, the dispenser 14 may be pivoted or otherwise movable between a non-dispensing position 150 (FIG. 8) and dispensing position 15 (FIG. 9) in which the outlet port is situated to dispense fluid into the film 22. As shown, the non-dispensing position 150 facilitates a compact configuration for system 10' by allowing the dispenser 14 to be pivoted away from the space occupied by the support mechanism 18" when in the loading position 112". Once the mechanism 18" has been moved to the operating position 110", dispenser 14 may be returned to its dispensing position 15 (FIG. 9), given the vacation of that position by mechanism 18" as a result of its upward/inward movement into the operating position 110".

After loading a fresh film roll 28 into system 10' and moving the support mechanism 18" into the operating position 110", the leading edge 151 of the film web 22 must be advanced from the roll and "threaded" through system 10', i.e., initially placed within the film-feed assembly 12', transverse seal mechanism 16, and calendering device 90. This process may be facilitated by virtue of certain additional features of system 10', as will now be described. Thus, for example, alternative film-drive mechanism 24' may be structured and arranged to be movable between a film-threading position (FIG. 9) and an operating position (FIG. 8). To this end, a portion 152 of the film-drive mechanism 24', e.g., the portion containing nip roller 48a, may be pivotally movable in a plane that is substantially transverse to path 52 of film web 22 through system 10'. As shown, this may be accomplished by mounting portion 152 of film-drive mechanism 24' in a bracket 154, which is pivotally mounted at 156 to upright frame 134'. As shown, pivotal mount 156 is oriented such that the pivotal axis thereof is substantially parallel to path 52. In this manner, portion 152 pivots in a plane that is substantially transverse to path 52, so that nip roller 48a pivotally separates from nip roller 48b in the film-threading position shown in FIG. 9, thereby allowing film 22 to be easily threaded therebetween, e.g., by simply pulling the leading edge 151 of the film 22 from guide roller 26 so that the film extends beyond, e.g., below, the film-drive mechanism 24.

Alternative calendering device 90' may similarly be structured and arranged to be movable between a film-threading position (FIG. 9) and an operating position (FIG. 8), e.g., by also being mounted to bracket 154 as shown or, alternatively, by being independently secured, e.g., in a pivotal manner, to upright frame 134'. In this manner, portion 158 of calendering device 90, e.g., containing calender roller 92a, is pivotally movable in a plane that is substantially transverse to path 52.

A portion of vent mechanism 80, e.g., needle rollers 86, may also be mounted to pivotal bracket 154 in order to facilitate the film threading operation.

Alternative transverse seal mechanism 16' may also be structured and arranged to be movable between a film-threading position (FIG. 9) and an operating position (FIG. 8). This may be effected by making a portion of the transverse seal mechanism 16', e.g., support member 68 thereof, pivotally movable in a plane that is substantially transverse to path 52. The support member 68 may be mounted to bracket 154 or, alternatively, may be independently movable, e.g., by being pivotally mounted to upright frame 134' at 160, independent of pivotal mount 156 for bracket 154.

Once the new film web 22 has been threaded into system 10', i.e., by pulling leading edge 151 past the venting mechanism 80, film-feed assembly 12', transverse seal mechanism 16', and calendering device 90', as shown in FIG. 9, and then inserting the dispenser 14 into the open longitudinal edge 36 of the film web 22, the bracket 154 may be pivotally moved in the direction of arrow 162 to the operating position shown in FIG. 8. The bracket 154 may be secured in this position via latch mechanism 164 in cooperation with catch device 166. Contact between bracket 154 and support member 68 may be employed to pivotally move the support member 68 into the operating position of FIG. 8, such that securing bracket 154 in such position via latch/catch 164/166 will also secure the transverse seal mechanism 16' in its operating position (FIG. 8). Such movement, i.e., from the film-threading position (FIG. 9) to the operating position (FIG. 8), brings both portions of the venting mechanism 80, film-feed assembly 12', transverse seal mechanism 16', and calendering device 90' together into an operational relationship with film web 22 therebetween, e.g., as shown in FIGS. 1-3. A transverse seal 60 would then be formed, by transverse seal mechanism 16', followed by resumption of the dispensation and sealing operation as shown in FIGS. 1-3.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A dispensing and sealing system, comprising:
   a. a film-feed assembly comprising a support mechanism for a supply of film and a film-drive mechanism to advance the film along a path;
   b. a dispenser with an outlet port for dispensing fluid into the film;
   c. a transverse seal mechanism for forming a seal in the film transversely of the path; and
   d. a calendering device comprising at least two calender rollers, between which the film is advanced along said path after receiving fluid therein, said calender rollers having relatively non-parallel outer surfaces such that the fluid in the film is dispersed in a predetermined manner upon contact with said non-parallel outer surfaces,
   wherein, at least one of said calender rollers includes a pair of end sections and a middle section therebetween, said roller being tapered, with a diameter that decreases from the middle section towards the end sections.

2. The system of claim 1, wherein at least one of said calender rollers provides at least one excess-fluid escape channel.

3. The system of claim 2, wherein said at least one excess-fluid escape channel is formed by a gap region of reduced diameter on said calender roller relative to adjacent regions thereof.

4. The system of claim 1, wherein said at least one excess-fluid escape channel is positioned adjacent to at least one of said end sections of said roller.

5. The system of claim 1, wherein said calendering device is positioned downstream of said transverse seal mechanism.

6. The system of claim 1, wherein said support mechanism is movable between an operating position and a loading position such that, when said support mechanism is in said loading position, said mechanism supports the film supply:
   (a) at a relatively lower elevation than when said support mechanism is in said operating position, and
   (b) relatively closer to an operator film-loading site than when said support mechanism is in said operating position.

7. The system of claim 1, wherein said transverse seal mechanism is structured and arranged to both sever and seal said film.

8. The system of claim 1, wherein said transverse seal mechanism is structured and arranged to be movable between a film-threading position and an operating position.

9. The system of claim 8, wherein a portion of said transverse seal mechanism is pivotally movable in a plane that is substantially transverse to said path.

10. The system of claim 1, further including a longitudinal seal mechanism for forming a longitudinal seal in the film that is substantially parallel to said path.

11. The system of claim 1, wherein said calendering device is structured and arranged to be movable between a film-threading position and an operating position.

12. The system of claim 11, wherein a portion of said calendering device is pivotally movable in a plane that is substantially transverse to said path.

13. The system of claim 1, wherein said film-drive mechanism is structured and arranged to be movable between a film-threading position and an operating position.

14. The system of claim 13, wherein a portion of said film-drive mechanism is pivotally movable in a plane that is substantially transverse to said path.

15. The system of claim 1, wherein said film-drive mechanism comprises a set of nip rollers between which said film passes to advance said film along said path, at least one of which is driven, and at least one of which has a gap to allow fluid from said dispenser to pass through said nip rolls.

16. The system of claim 1, wherein said transverse seal mechanism and said film drive mechanism are structured and arranged to be movable between a film-threading position and an operating position.

17. The system of claim 16, wherein said transverse seal mechanism and said film drive mechanism are independently movable.

18. The system of claim 1, wherein said film-feed assembly, dispenser, transverse seal mechanism, and calendering device are attached to a frame in the form of an integrated assembly.

19. The system of claim 1, wherein said dispenser is adapted to dispense a material selected from the group consisting of polyols, isocyanates, and mixtures of polyols and isocyanates.

20. The system of claim 1, wherein said dispenser is structured and arranged to be movable between a non-dispensing position and a dispensing position in said outlet port is situated to dispense fluid into the film.

21. A dispensing and sealing system, comprising:
   a. a film-feed assembly comprising a support mechanism for a supply of film and a film-drive mechanism to advance the film along a path;
   b. a dispenser with an outlet port for dispensing fluid into the film;
   c. a transverse seal mechanism for forming a seal in the film transversely of the path; and
   d. a calendering device comprising at least two calender rollers, between which the film is advanced along said path after receiving fluid therein, said calender rollers having relatively non-parallel outer surfaces such that the fluid in the film is dispersed in a predetermined manner upon contact with said non-parallel outer surfaces,
   wherein, said calendering device is positioned downstream of said transverse seal mechanism.

* * * * *